Patented Nov. 6, 1934

1,979,717

UNITED STATES PATENT OFFICE 1,979,717

PREPARATION OF ORGANIC ESTERS

Walter E. Vail, Wilmington, Del., assignor to E. I. du Pont de Nemours & Company, Wilmington, Del., a corporation of Delaware No Drawing. Application December 31, 1931, Serial No. 584,296

16 Claims. (Cl. 260—106)

This invention relates to the synthesis of organic compounds and particularly to the preparation of organic esters by the interaction of olefinic hydrocarbons, carbon monoxide, and aliphatic alcohols or compounds which decompose to form the alcohols.

Various processes have been proposed for the preparation of the esters of the fatty acids. For example, they have been produced by direct esterification, i. e. by direct action of the acid on the alcohols. The reaction proceeds but slowly, when conducted in this manner. For example, in the esterification of acetic acid by ethyl alcohol, even in boiling solution, equilibrium conditions are not reached until after the lapse of several hours. Moreover, when preparing the higher esters, by direct esterification, the reaction rates are so extremely slow that catalytic agents are usually introduced. Even with highly active catalysts present, the reaction time is usually a matter of hours. The many disadvantages of preparing alkyl esters by direct esterification are apparent. These disadvantages, which include expensive raw materials, corrosion difficulties encountered with acid solutions under elevated temperatures, as well as the length of time materials are in process, etc., are likewise present in other processes of ester formation known heretofore.

An object of the present invention is to provide a process which overcomes many of the inherent difficulties encountered in processes, at present employed, for the preparation of organic esters. Another object of the invention is to provide a process for the preparation of alkyl, aryl, or aralkyl esters. A further object of the invention is to provide a process for the preparation of alkyl esters by the interaction of an olefinic hydrocarbon, an oxide of carbon, and an alcohol. A still further object of the invention is to provide a process for the preparation of alkyl esters by the interaction of olefines, carbon monoxide, and alcohols or compounds which decompose under the conditions of the reaction to form the alcohols. Other objects and advantages of the invention will hereinafter appear.

I have found that organic esters, and more particularly the alkyl esters of the aliphatic carboxylic acids can be prepared from carbon monoxide, and olefinic hydrocarbon, and an aliphatic alcohol, or in lieu of the alcohol a compound which, under the conditions of the reaction, will decompose to form an alcohol. The olefinic hydrocarbons which are well adapted for this process are those containing a double bond such for example as the olefines, ethylene, propylene, butylene, etc. These hydrocarbons may be represented by the formula: $RR_1C{=}CR_2R_3$ — in which R, $R_1$, $R_2$, and $R_3$ represent hydrogen (H) or an alkyl, aryl, or aralkyl radical. The ester-forming reaction of the hydrocarbon with carbon monoxide and the alcohol apparently proceeds in accordance with the equation—

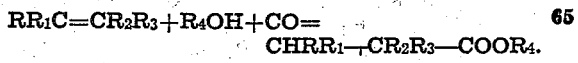

Ethylene, for example, reacts with ethanol and carbon monoxide to form ethyl propionate in substantially the following manner:

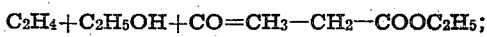

propylene and butylene similarly yield ethyl butyrate and ethyl valerate, respectively. By utilizing other aliphatic alcohols numerous other organic esters can be prepared, such, for example, as the following: carbon monoxide reacting with methanol and ethylene to give methyl propionate; ethanol and propylene to give ethyl butyrate; propanol and ethylene to give propyl propionate; etc.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or by other methods, and should likewise, for the best results, be relatively pure, it being particularly desirable to avoid the presence therein of metallic carbonyls or large amounts of sulphur compounds.

Inert gases, such as nitrogen, methane, and carbon dioxide, may be included with the reactants, this being advantageous in some cases from the standpoint of controlling the temperature of the exothermic reaction and limiting the extent thereof, for it may be desired to restrict the over-all conversion of the reaction for the sake of enhancing the relative yield of the desired esters.

The relative proportions of the reactants can be varied altho it has been found that in order to avoid side reactions involving the olefine it is advantageous to work with the alcohol and carbon monoxide in excess with respect to the olefinic hydrocarbon. Concentrations of the latter within the range of from 1½ to 10%, by volume, of the total reactants have been employed, with pressures of 500 atmospheres or more, with particularly good results. Higher concentrations may be used but under such conditions correspondingly lower pressures should generally be employed.

The use of pressure in excess of atmospheric, say from 25–900 atmospheres, is preferred, although somewhat higher pressures may, if desired, be used. The reaction proceeds over a wide range of temperatures while working under these pressures, although the optimum temperature varies with the specific cases, depending inter alia upon the reactants being used. Generally the desired reaction can be obtained at from 200–500° C. From the standpoint of practical operation the temperature should not be so low that the reaction rate is uneconomical nor so high as to result in undesirable by-products by decomposition and/or polymerization of the raw materials. From this point of view the process has been found to operate very satisfactorily at from 275–375° C.

In operating my process it is not essential that an alcohol be employed as one of the raw materials for the alcohols described above may be replaced, if desired, wholly or partly by the corresponding alkyl ethers, such as dimethyl ether, diethyl ether, or the mixed alkyl ethers. Other organic compounds which may be used to replace an alcohol include the alkyl esters, the alkyl amines, or the alkyl halides, or, in fact, any organic compound which, under the conditions of the reaction, will hydrolyze or otherwise decompose to give the alcohol. When conducting the process with these compounds in lieu of the alcohols, it is usually advisable to inject water into the system.

The following examples will illustrate methods of practising the invention, although the invention is not limited thereto:

*Example 1.*—Into a gaseous mixture comprising 4.5% ethylene, 32% carbon monoxide, and 63.5% hydrogen and inerts, a 100% methanol solution containing 1% ammonium chloride was injected to give a mixture containing 12.5% of methanol. The resulting gaseous mixture was passed, at a pressure of 700 atmospheres, and a temperature of 325° C., over activated charcoal, the catalyst being disposed in a reaction chamber suitable for conducting exothermic gaseous reactions under elevated temperature and pressure. The gases from the reaction were condensed, giving a condensate containing approximately 3.6% methyl propionate which indicated a yield of approximately 16% of the theoretical.

*Example 2.*—Into a gaseous mixture of ethylene, carbon monoxide and hydrogen, in the proportions as shown in Example 1, there was injected a 95% ethanol solution containing 1% ammonium chloride, thereby giving a mixture containing 8% ethanol. The resulting mixture was passed, at a pressure of 700 atmospheres and a temperature of 325° C., over activated charcoal. A condensate was obtained, upon cooling the converted gases, which contained 3.1% propionic acid, and 11.4% ethyl propionate. This constituted a yield of approximately 46% of the theoretical.

*Example 3.*—A gaseous mixture consisting of 88 parts by volume of carbon monoxide, 4 parts ethylene is admixed with approximately 8 parts ethyl chloride and 6 parts of steam. The resulting gaseous mixture at a pressure of 700 atmospheres and a temperature of 325° C. is contacted with activated charcoal. A good yield of ethyl propionate is obtained.

*Example 4.*—100% methanol solution was injected into a gaseous mixture containing 32% by volume of carbon monoxide, 4.5% by volume of ethylene, and 63.5% by volume of hydrogen and inerts, in sufficient amount to give approximately 12.5% of methanol to the total volume of the resulting gaseous mixture. The gaseous mixture was then passed, at a pressure of 700 atmospheres and a temperature of 325° C., over activated charcoal impregnated with phosphoric acid. A condensate was obtained, upon cooling the converted gases, which contained 5.8% propionic acid and 9.2% methyl propionate, indicating a yield of approximately 20% of the theoretical. Approximately 50% of the inlet methanol was converted to methyl ether.

Other catalysts that may be employed in the process include generally inorganic acids that are not substantially volatilized at the temperature of the synthesis, e. g. acids of phosphorus, arsenic, boron. Activated charcoal alone has proven to be a good catalyst for the reaction and when used in conjunction with the inorganic acids, particularly so. The following catalysts are likewise suitable: calcium chloride, cadmium phosphate, silico-tungstic acid, zinc chloride, calcium fluoride, calcium iodide, and sodium bromide. In fact, those catalysts which have been found suitable for use in the propionic acid synthesis from carbon monoxide, ethylene and water, and acetic acid synthesis from methanol and carbon monoxide are likewise active as catalysts for my process of preparing organic esters. A number of these catalysts have been described in the copending applications of G. B. Carpenter Serial Nos. 559,121, 559,122, 559,124, 559,126, and U. S. Patents Nos. 1,924,767 and 1,924,768, as well as the application and patent in which I am a joint inventor with A. T. Larson, Serial No. 577,391 and U. S. Patent No. 1,924,765, respectively.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese or nickel.

Various changes may be made in the method hereinbefore described without departing from this invention or sacrificing any of the advantages that may be derived therefrom.

I claim:

1. The process of producing alkyl esters of the aliphatic carboxylic acids which comprises reacting an olefinic hydrocarbon, carbon monoxide, and an organic compound selected from the group consisting of an alcohol and a compound which under the conditions of the reaction decomposes to form an alcohol, substantially in accordance with the following equation:

$$RR_1C=CR_2R_3+R_4OH+CO=CHRR_1-CR_2R_3-COOR_4$$

in which R, $R_1$, $R_2$, and $R_3$ represent hydrogen (H) or an alkyl radical and in which $R_4$ represents an alkyl radical.

2. The process of producing alkyl esters of the aliphatic carboxylic acids which comprises reacting ethylene, carbon monoxide, and an aliphatic alcohol, substantially in accord with the equation:

$$C_2H_4+ROH+CO=C_2H_5COOR$$

in which R indicates an alkyl radical.

3. The process of producing methyl propionate which comprises reacting ethylene, carbon monoxide, and methanol substantially in accordance with the equation:

$$C_2H_4+CH_3OH+CO=C_2H_5COOCH_3.$$

4. The process of producing ethyl propionate which comprises reacting ethylene, carbon monoxide, and ethanol substantially in accordance with the equation:

$$C_2H_4+C_2H_5OH+CO=C_2H_5COOC_2H_5.$$

5. The process of producing ethyl butyrate which comprises reacting propylene, carbon monoxide, and ethanol substantially in accordance with the equation:

$$C_3H_6+C_2H_5OH+CO=C_3H_7COOC_2H_5.$$

6. The process which comprises reacting an olefine, carbon monoxide, and an organic compound selected from the group consisting of an aliphatic alcohol and a compound which decomposes under the conditions of the reaction to form such an alcohol and thereby producing an alkyl ester of an aliphatic carboxylic acid.

7. The process which comprises reacting an olefinic hydrocarbon, carbon monoxide, water vapor, and a compound selected from the group consisting of saturated monohydroxy aliphatic alcohols, the alkyl ethers, the alkyl esters, the alkyl amines, and the alkyl halides and thereby producing an alkyl ester of the aliphatic carboxylic acids.

8. The process which comprises reacting ethylene, carbon monoxide, and methanol and thereby producing methyl propionate.

9. The process which comprises reacting ethylene, carbon monoxide, and ethanol and thereby producing ethyl propionate.

10. The process which comprises reacting propylene, carbon monoxide, and ethanol, and thereby producing ethyl butyrate.

11. In a process of reacting an olefinic hydrocarbon, carbon monoxide, and an aliphatic alcohol, and thereby producing an alkyl ester of an aliphatic carboxylic acid, the step which comprises employing an excess of the carbon monoxide and alcohol with relation to the olefinic hydrocarbon.

12. In a process of reacting an olefinic hydrocarbon, carbon monoxide, and an aliphatic alcohol, and thereby producing an alkyl ester of an aliphatic carboxylic acid, the step which comprises effecting the reaction under elevated pressure.

13. In a process of reacting an olefinic hydrocarbon, carbon monoxide, and an aliphatic alcohol, and thereby producing an alkyl ester of an aliphatic carboxylic acid, the step which comprises effecting the reaction at a temperature of from 200 to 500° C.

14. A process for the preparation of alkyl esters of the aliphatic carboxylic acids which comprises reacting an olefinic hydrocarbon, carbon monoxide, and an organic compound selected from the group consisting of an aliphatic alcohol and an organic compound which, under the conditions of the reaction, hydrolyzes or otherwise decomposes to form an alcohol in the presence of a catalyst capable of promoting the synthesis of aliphatic acids from olefines, carbon monoxide, and steam, or from alcohols and carbon monoxide.

15. A process for the preparation of alkyl esters of the aliphatic carboxylic acids which comprises reacting an olefinic hydrocarbon, carbon monoxide, and a compound selected from the group consisting of saturated monohydroxy aliphatic alcohols, the alkyl ethers, the alkyl esters, the alkyl amines, and the alkyl halides in the presence of a catalyst capable of promoting the synthesis of aliphatic acids from olefines, carbon monoxide, and steam, or from alcohols and carbon monoxide.

16. A process for the preparation of methyl propionate which comprises contacting methanol and a gaseous mixture comprising approximately 4.5% ethylene, 32% carbon monoxide, and 63.5% hydrogen and an inert gas, the methanol containing ammonium chloride being injected into the gaseous mixture to give approximately 12.5% of methanol to the total volume of the resulting gaseous mixture, the reaction being conducted under pressure and temperature of approximately 700 atmospheres and 325° C. respectively.

WALTER E. VAIL.